United States Patent
Uejima

(10) Patent No.: US 12,482,943 B2
(45) Date of Patent: Nov. 25, 2025

(54) RADIO FREQUENCY MODULE AND COMMUNICATION DEVICE

(71) Applicant: Murata Manufacturing Co., Ltd., Kyoto (JP)

(72) Inventor: Takanori Uejima, Kyoto (JP)

(73) Assignee: MURATA MANUFACTURING CO., LTD., Kyoto (JP)

(*) Notice: Subject to any disclaimer, the term of this patent is extended or adjusted under 35 U.S.C. 154(b) by 351 days.

(21) Appl. No.: 18/302,153

(22) Filed: Apr. 18, 2023

(65) Prior Publication Data
US 2023/0261382 A1 Aug. 17, 2023

Related U.S. Application Data

(63) Continuation of application No. PCT/JP2021/036173, filed on Sep. 30, 2021.

(30) Foreign Application Priority Data

Nov. 17, 2020 (JP) ................................ 2020-191180

(51) Int. Cl.
*H01Q 9/04* (2006.01)
*H01Q 1/24* (2006.01)
*H01Q 1/42* (2006.01)
*H04B 1/44* (2006.01)

(52) U.S. Cl.
CPC ........... *H01Q 9/0414* (2013.01); *H01Q 1/241* (2013.01); *H01Q 1/427* (2013.01); *H04B 1/44* (2013.01)

(58) Field of Classification Search
None
See application file for complete search history.

(56) References Cited

U.S. PATENT DOCUMENTS

2012/0287010 A1* 11/2012 Soekawa ................. H01Q 7/00
            343/848
2020/0128689 A1  4/2020 Hosotani
2021/0126341 A1  4/2021 Mizunuma
2022/0360023 A1* 11/2022 Kim ...................... H01R 12/73

FOREIGN PATENT DOCUMENTS

| JP | 2007-035739 A | 2/2007 |
|----|---------------|--------|
| JP | 2012-033885 A | 2/2012 |
| JP | 2012-209356 A | 10/2012 |
| JP | 2012-239030 A | 12/2012 |
| JP | 2015-173324 A | 10/2015 |
| WO | 2019/009062 A1 | 1/2019 |
| WO | 2020/009037 A1 | 1/2020 |

OTHER PUBLICATIONS

International Search Report for PCT/JP2021/036173 dated Dec. 14, 2021.

* cited by examiner

*Primary Examiner* — Wilson Lee
(74) *Attorney, Agent, or Firm* — McDonald Hopkins LLC

(57) ABSTRACT

A radio frequency module includes submodules and a connection board that connects the submodule and the submodule. The submodule includes a module board and a first component arranged on the module board, the submodule includes a module board and a second component arranged on the module board, and the connection board is directly connected to the module boards and electrically connects the first component and the second component.

18 Claims, 5 Drawing Sheets

RADIO FREQUENCY MODULE AND COMMUNICATION DEVICE

CROSS REFERENCE TO RELATED APPLICATION

This is a continuation of International Application No. PCT/JP2021/036173 filed on Sep. 30, 2021 which claims priority from Japanese Patent Application No. 2020-191180 filed on Nov. 17, 2020. The contents of these applications are incorporated herein by reference in their entireties.

BACKGROUND OF THE DISCLOSURE

Field of the Disclosure

The present disclosure relates to radio frequency modules and communication devices.

Description of the Related Art

In mobile communication devices such as cellular phones and the like, particularly, with the development of multiband systems, the number of circuit elements that make up a radio frequency front-end circuit is increasing.

Patent Document 1 discloses a radio frequency module (electronic component module) in which the electronic components making up a radio frequency front-end circuit are mounted on both sides of a circuit board. The electronic components mounted on the circuit board are covered with a sealing resin layer, and connection terminals (pad electrodes) are formed on the surface of this sealing resin layer for the connection with an external board (mounting board).

Patent Document 1: Japanese Unexamined Patent

BRIEF SUMMARY OF THE DISCLOSURE

However, in a radio frequency module having the configuration in which a plurality of the electronic component modules (submodules) disclosed in Patent Document 1 are mounted on a mounting board, when electronic components arranged in different submodules are electrically connected via the mounting board, a connection wiring line connecting these electronic components becomes longer, and this leads to the issue of an increase in transmission loss of a radio frequency signal.

The present disclosure is made to resolve the foregoing issue, and a possible benefit thereof is to provide a radio frequency module and a communication device, each of which enables the reduction of transmission loss of a plurality of submodules arranged on a mounting board.

A radio frequency module according to one aspect of the present disclosure includes a first module, a second module, and a connection board that connects the first module and the second module. The first module includes a first module board and a first component arranged on the first module board, the second module includes a second module board and a second component arranged on the second module board, and the connection board is directly connected to the first module board and the second module board and electrically connects the first component and the second component.

According to the present disclosure, it becomes possible to provide a radio frequency module and a communication device, each of which enables the reduction of transmission loss of a plurality of submodules arranged on a mounting board.

DETAILED DESCRIPTION OF THE DISCLOSURE

Figure 1:
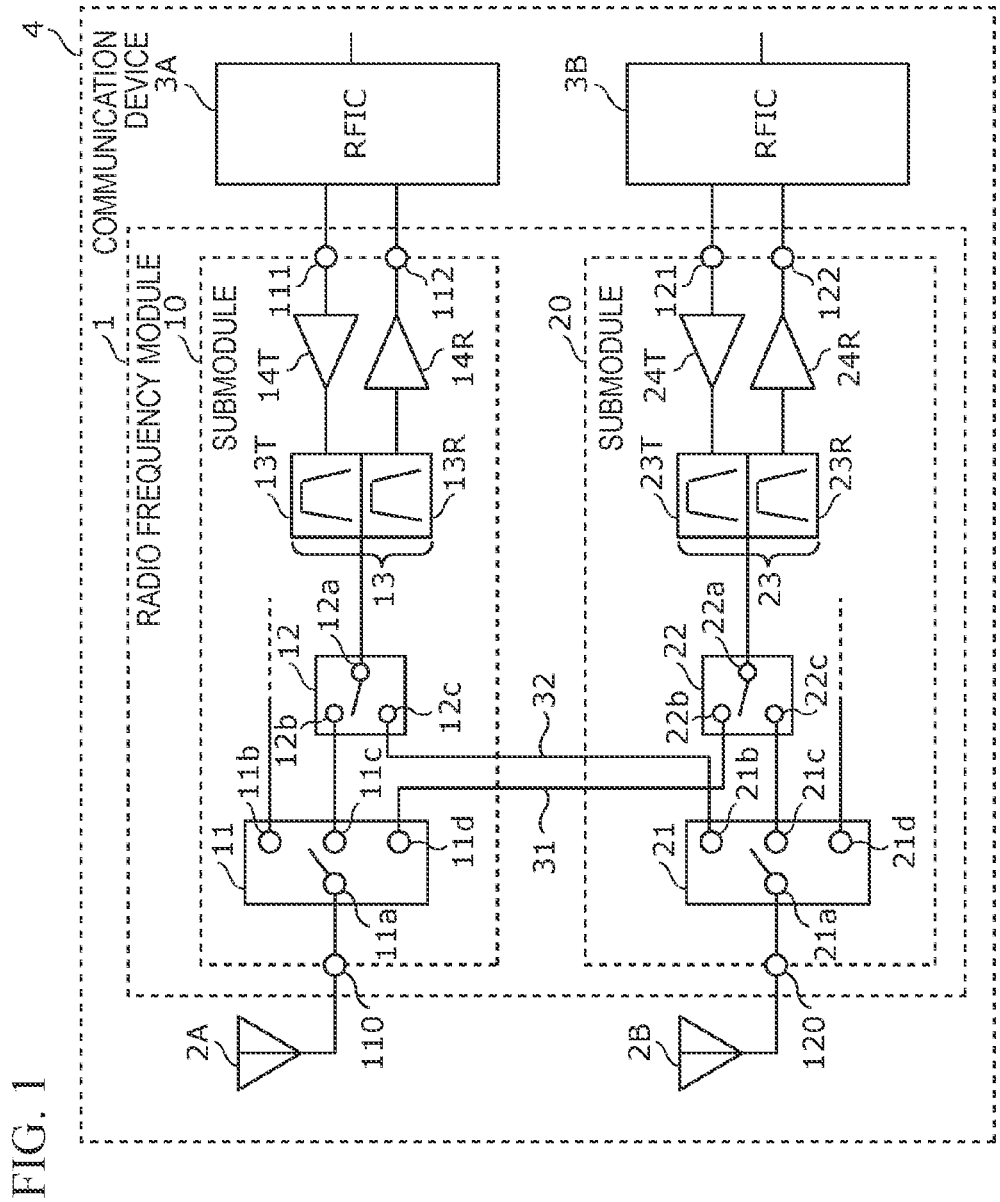
FIG. 1 is a circuit configuration diagram of a radio frequency module and a communication device according to an embodiment.

Hereinafter, embodiments of the present disclosure will be described in detail. Note that the embodiments, which will be described below, each illustrate a comprehensive or specific example. Numeric values, shapes, materials, constituent elements, arrangements and connection modes of the constituent elements, and the like illustrated in the following embodiments are mere examples, and not intended to limit the present disclosure. Of constituent elements in the following working example and modified example, the constituent elements that are not described in an independent claim will be described as optional constituent elements. Further, sizes or ratios of the sizes of constituent elements illustrated in the drawings are not necessarily exact ones. In the respective drawings, same reference characters are attached to substantially the same constituent elements, and in some cases, overlapping descriptions are omitted or simplified.

Further, in the following section, terms indicating relationships among elements such as "parallel", "vertical", and the like, terms indicating shapes of elements such as "rectangle" and the like, and numerical ranges are used not only to represent their precise meanings but also include their substantially equivalent ranges, for example, variations of about few %.

Further, in the following section, with regard to A, B, and C mounted on a board, "C is arranged between A and B in the plan view of the board (or a principal surface of the board)" is defined to mean that in the plan view of the board, at least one of a plurality of line segments each connecting an arbitrary point within A and an arbitrary point within B passes through an area of C. Further, the plan view of a board is defined to mean that the board and circuit elements mounted on the board are projected orthographically onto a plane parallel to a principal surface of the board for viewing.

Further, in the following section, "A is arranged on a first principal surface of a board" is defined to mean not only the case where A is directly mounted on the first principal surface but also the case where, of a space on the first principal surface side and a space on the second principal surface side, which are divided by the board, A is arranged in the space on the first principal surface side. That is to say, "A is arranged on a first principal surface of a board" also includes the case where A is mounted on the first principal surface with another circuit element, an electrode, or the like interposed therebetween.

Further, in the following section, a "transmit path" is defined to mean a transmission line made up of a wiring line that transmits a radio frequency transmit signal, an electrode directly connected to this wiring line, a terminal directly connected to this wiring line or this electrode, and the like. Further, a "receive path" is defined to mean a transmission line made up of a wiring line that transmits a radio frequency receive signal, an electrode directly connected to this wiring line, a terminal directly connected to this wiring line or this electrode, and the like. Further, a "signal path" is defined to mean a transmission line made up of a wiring line that transmits a radio frequency signal, an electrode directly connected to this wiring line, a terminal directly connected to this wiring line or this electrode, and the like.

Embodiment

1. Circuit Configuration of Radio Frequency Module 1 and Communication Device 4

FIG. 1 is a circuit configuration diagram of a radio frequency module 1 and a communication device 4 according to an embodiment. As illustrated in FIG. 1, the communication device 4 includes the radio frequency module 1, antennas 2A and 2B, and RF signal processing circuits (RFICs) 3A and 3B. The radio frequency module 1 includes submodules 10 and 20.

The RFICs 3A and 3B are RF signal processing circuits that perform processing on radio frequency signals being transmitted and received by the antennas 2A and 2B. Specifically, the RFIC 3A performs signal processing such as down-converting and the like on a receive signal inputted via a receive path of the submodule 10, and outputs a receive signal generated by this signal processing to a baseband signal processing circuit (not illustrated). Further, the RFIC 3A performs signal processing such as up-converting and the like on a transmit signal inputted from the baseband signal processing circuit, and outputs a transmit signal generated by this signal processing to a transmit path of the submodule 10. Further, the RFIC 3B performs signal processing such as down-converting and the like on a receive signal inputted via a receive path of the submodule 20, and outputs a receive signal generated by this signal processing to the baseband signal processing circuit (not illustrated). Further, the RFIC 3B performs signal processing such as up-converting and the like on a transmit signal inputted from the baseband signal processing circuit, and outputs a transmit signal generated by this signal processing to a transmit path of the submodule 20.

Further, the RFIC 3A functions as a control unit that controls the connections of switches 11 and 12 included in the submodule 10 based on the communication band (frequency band) to be used, the antenna sensitivity, and the like. Further, the RFIC 3B functions as a control unit that controls the connections of switches 21 and 22 included in the submodule 20 based on the communication band (frequency band) to be used, the antenna sensitivity, and the like.

Further, the RFIC 3A also functions as a control unit that controls the gain of a power amplifier 14T included in the submodule 10 and a power voltage Vcc and a bias voltage Vbias to be supplied to the power amplifier 14T. Further, the RFIC 3B also functions as a control unit that controls the gain of a power amplifier 24T included in the submodule 20 and a power voltage Vcc and a bias voltage Vbias to be supplied to the power amplifier 24T.

Note that the foregoing control units may be provided outside the RFICs 3A and 3B.

The antenna 2A is connected to an antenna connection terminal 110 of the submodule 10, emits a radio frequency signal outputted from the submodule 10 or 20, and receives a radio frequency signal from outside and outputs the received radio frequency signal to the submodule 10 or 20. The antenna 2B is connected to an antenna connection terminal 120 of the submodule 20, emits a radio frequency signal outputted from the submodule 10 or 20, and receives a radio frequency signal from outside and outputs the received radio frequency signal to the submodule 10 or 20.

Note that in the communication device 4 according to the present embodiment, the antennas 2A and 2B are not essential constituent elements.

Next, the configuration of the radio frequency module 1 is described below in detail.

The submodule 10 is one example of a first module and includes the antenna connection terminal 110, a transmit input terminal 111, a receive output terminal 112, the switches 11 and 12, a duplexer 13, the power amplifier 14T, and a low-noise amplifier 14R.

The submodule 20 is one example of a second module and includes the antenna connection terminal 120, a transmit input terminal 121, a receive output terminal 122, the switches 21 and 22, a duplexer 23, the power amplifier 24T, and a low-noise amplifier 24R.

The antenna terminal 110 is one example of a first antenna connection terminal and is connected to the antenna 2A and the switch 11. The antenna terminal 120 is one example of a second antenna connection terminal and is connected to the antenna 2B and the switch 21.

The power amplifier 14T is an amplifier that amplifies a radio frequency signal of a first communication band inputted from the transmit input terminal 111. Further, the power amplifier 24T is an amplifier that amplifies a radio frequency signal of a second communication band inputted from the transmit input terminal 121.

The low-noise amplifier 14R is an amplifier that amplifies a radio frequency signal of the first communication band with low noise and outputs this amplified signal to the receive output terminal 112. Further, the low-noise amplifier 24R is an amplifier that amplifies a radio frequency signal of the second communication band with low noise and outputs this amplified signal to the receive output terminal 122.

The duplexer 13 is made up of a transmit filter 13T and a receive filter 13R. The transmit filter 13T is one example of a first filter and is connected between the switch 12 and the power amplifier 14T. Further, the receive filter 13R is one example of the first filter and is connected between the switch 12 and the low-noise amplifier 14R.

The duplexer 23 is made up of a transmit filter 23T and a receive filter 23R. The transmit filter 23T is one example of a second filter and is connected between the switch 22 and the power amplifier 24T. Further, the receive filter 23R is one example of the second filter and is connected between the switch 22 and the low-noise amplifier 24R.

The switch 11 is one example of a first antenna switch and includes a common terminal 11a and selection terminals 11b, 11c, and 11d. The common terminal 11a is connected to the antenna connection terminal 110, the selection terminal 11c is connected to the switch 12, and the selection terminal 11d is connected to the switch 22. According to this, the switch 11 switches between connecting and disconnecting the antenna connection terminal 110 to and from the switch 12, and switches between connecting and disconnecting the antenna connection terminal 110 to and from the switch 22.

The switch 21 is one example of a second antenna switch and includes a common terminal 21a and selection terminals 21b, 21c, and 21d. The common terminal 21a is connected to the antenna connection terminal 120, the selection terminal 21b is connected to the switch 12, and the selection terminal 21c is connected to the switch 22. According to this, the switch 21 switches between connecting and disconnecting the antenna connection terminal 120 to and from the switch 22, and switches between connecting and disconnecting the antenna connection terminal 120 to and from the switch 21.

The switches 11 and 21 are each made up of, for example, a multi-connection type switch circuit. Note that the numbers of the selection terminals of the switches 11 and 21 are appropriately determined based on the number of communication bands to be handled by the submodules 10 and 20.

The switch 12 is one example of a first switch and includes a common terminal 12a and selection terminals 12b and 12c. The common terminal 12a is connected to the duplexer 13, the selection terminal 12b is connected to the selection terminal 11c, and the selection terminal 12c is connected to the selection terminal 21b. According to this, the switch 12 switches between connecting the duplexer 13 to the switch 11 and connecting the duplexer 13 to the switch 21.

The switch 22 is one example of the second switch and includes a common terminal 22a and selection terminals 22b and 22c. The common terminal 22a is connected to the duplexer 23, the selection terminal 22b is connected to the selection terminal 11d, and the selection terminal 22c is connected to the selection terminal 21c. According to this, the switch 22 switches between connecting the duplexer 23 to the switch 11 and connecting the duplexer 23 to the switch 21.

The switches 12 and 22 are each made up of, for example, a SPDT (Single Pole Double Throw) type switch circuit.

The selection terminal 11d of the switch 11 is connected to the selection terminal 22b of the switch 22 via a wiring line 31. Further, the selection terminal 12c of the switch 12 is connected to the selection terminal 21b of the switch 21 via a wiring line 32.

Note that each of the duplexers 13 and 23 may alternatively be a single filter for transmission using a time division duplex (TDD) system. In this case, the foregoing single filter is preceded, followed, or preceded and followed by a switch that switches between transmitting and receiving.

Further, an impedance matching circuit may be inserted between the antenna connection terminal 110, the switch 11, the switch 12, the duplexer 13, the power amplifier 14T and the low-noise amplifier 14R, and the transmit input terminal 111 and the receive output terminal 112, which make up the submodule 10. Further, an impedance matching circuit may be inserted between the antenna connection terminal 120, the switch 21, the switch 22, the duplexer 23, the power amplifier 24T and the low-noise amplifier 24R, and the transmit input terminal 121 and the receive output terminal 122, which make up the submodule 20.

Note that the low-noise amplifier 14R and the switches 11 and 12 may be formed in a first semiconductor IC (Integrated Circuit). Further, the low-noise amplifier 24R and the switches 21 and 22 may be formed in a second semiconductor IC. Each of the first semiconductor IC and the second semiconductor IC is, for example, composed of CMOS. Specifically, each of the first semiconductor IC and the second semiconductor IC is formed by a SOI (Silicon On Insulator) process. Note that the first semiconductor IC and the second semiconductor IC may be composed of at least one of GaAs, SiGe, and GaN. Because of this, it becomes possible to output a radio frequency signal with high quality amplification performance and noise performance.

Note that of the switch 11, the switch 12, the duplexer 13, the power amplifier 14T, and the low-noise amplifier 14R, the submodule 10 according to the present disclosure only needs to include two circuit components (first component and fourth component). Further, of the switch 21, the switch 22, the duplexer 23, the power amplifier 24T, and the low-noise amplifier 24R, the submodule 20 according to the present disclosure only needs to include one circuit component (second component). At this time, it is only necessary that the first component of the submodule 10 and the second component of the submodule 20 are directly connected via a first wiring line.

Here, with the configuration in which the submodules 10 and 20 are arranged on a mounting board, when the submodules 10 and 20 are electrically connected via the mounting board, connection wiring lines connecting the submodules 10 and 20 become longer, and this leads to the issue of an increase in transmission loss of a radio frequency signal.

In contrast, in the radio frequency module 1 according to the present embodiment, the configuration in which the submodules 10 and 20 are arranged on the mounting board has a configuration that reduces the transmission loss of the radio frequency module 1. In the following section, the configuration that reduces the transmission loss of the radio frequency module 1 according to the present embodiment is described.

2. Exemplary Configuration of Communication Device 4 According to Embodiment

Figure 2:
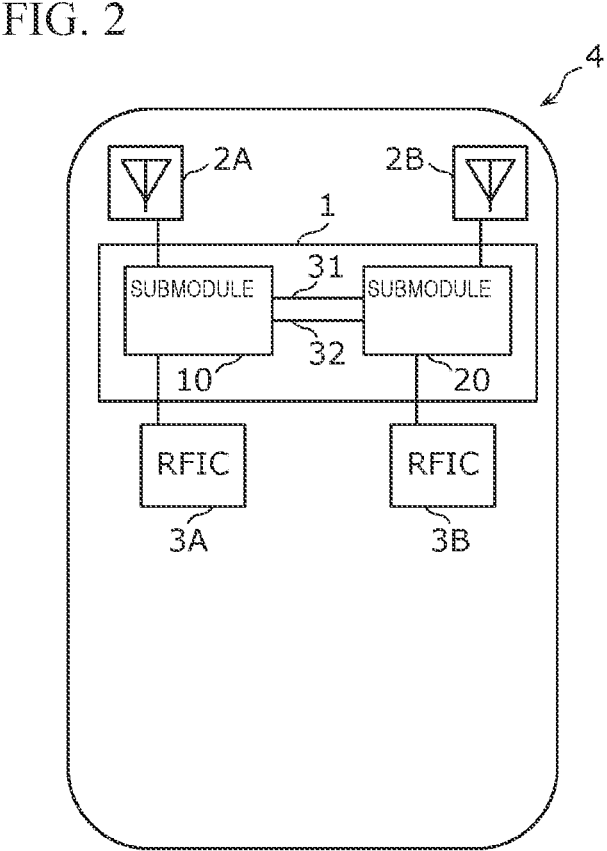
FIG. 2 is a diagram illustrating an exemplary configuration of the communication device according to the embodiment.

FIG. 2 is a diagram illustrating an exemplary configuration of the communication device 4 according to the embodiment. The communication device 4 illustrated in FIG. 2 depicts, for example, a mobile terminal. As illustrated in FIG. 2, the antennas 2A and 2B are arranged on the top left corner and the top right corner of the mobile terminal, respectively. In addition to the submodules 10 and 20, the radio frequency module 1 further includes a mounting board 91. The submodules 10 and 20 are arranged on the mounting board 91 and connected to each other via wiring lines 31 and 32. The RFIC 3A and the antenna 2A are connected to the submodule 10, and the RFIC 3B and the antenna 2B are connected to the submodule 20. Note that the RFICs 3A and 3B may be arranged on the mounting board 91.

Here, the wiring lines 31 and 32 are arranged in such a manner as to be separated from the mounting board 91.

With the foregoing configuration, the submodule 10 and the submodule 20 are directly connected to the wiring lines 31 and 32, and thus the wiring lines that connect the submodule 10 and the submodule 20 can be shortened compared with the case where the submodule 10 and the submodule 20 are electrically connected via the mounting board 91. Accordingly, the transmission loss of a radio frequency signal being transmitted between the submodule 10 and the submodule 20 can be reduced. In the following section, the layout configuration of the mounting board 91, the submodules 10 and 20, and the wiring lines 31 and 32 is described in detail.

Note that "the submodule 10 and the submodule 20 are directly connected to the wiring line 31" is defined to mean that the submodule 10 and the submodule 20 are connected to each other via the wiring line 31 without involving a circuit component or a board other than a connection board 30. Further, "the submodule 10 and the submodule 20 are directly connected to the wiring line 31" is defined to include the case where the submodule 10 and the submodule 20 are connected to each other via electrodes and terminals connected to the end portions of the wiring line 31.

Further, "the submodule 10 and the submodule 20 are directly connected to the wiring line 32" is defined to mean that the submodule 10 and the submodule 20 are connected to each other via the wiring line 32 without involving a circuit component and a board other than the connection board 30. Further, "the submodule 10 and the submodule 20 are directly connected to the wiring line 32" is defined to include the case where the submodule 10 and the submodule 20 are connected to each other via electrodes and terminals connected to the end portions of the wiring line 32.

Further, "a module board 81 and a module board 82 are directly connected to the connection board 30" is defined to mean that the module board 81 and the module board 82 are connected to each other via the connection board 30 without involving a circuit component and a board other than the connection board 30. Further, "the module board 81 and the module board 82 are directly connected to the connection board 30" is defined to include the case where the module board 81 and the module board 82 are connected to each other via electrodes and terminals connected to the end portions of the connection board 30.

Figure 3:
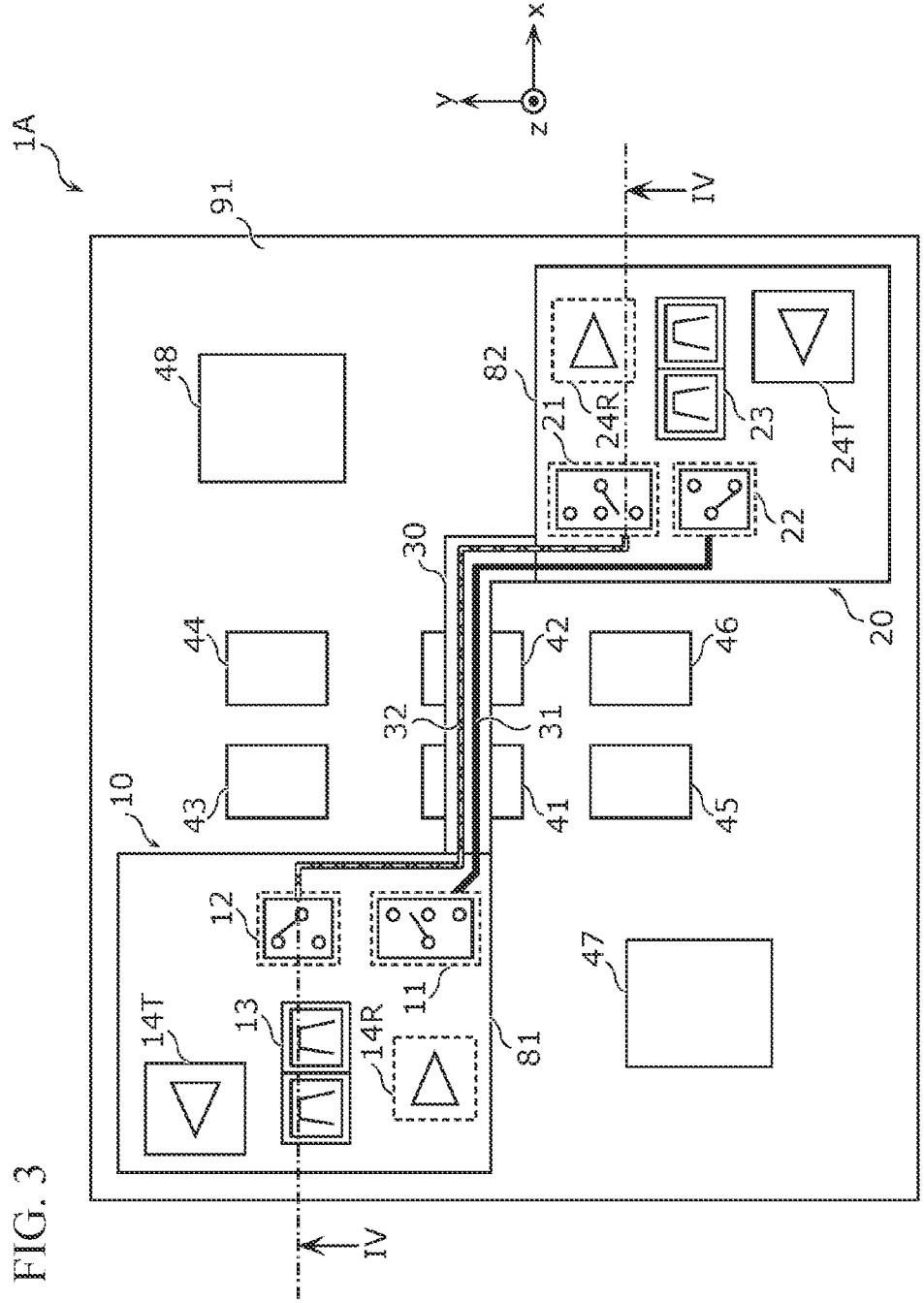
FIG. 3 is a plan view of schematic configuration of the radio frequency module according to a working example.
Figure 4:
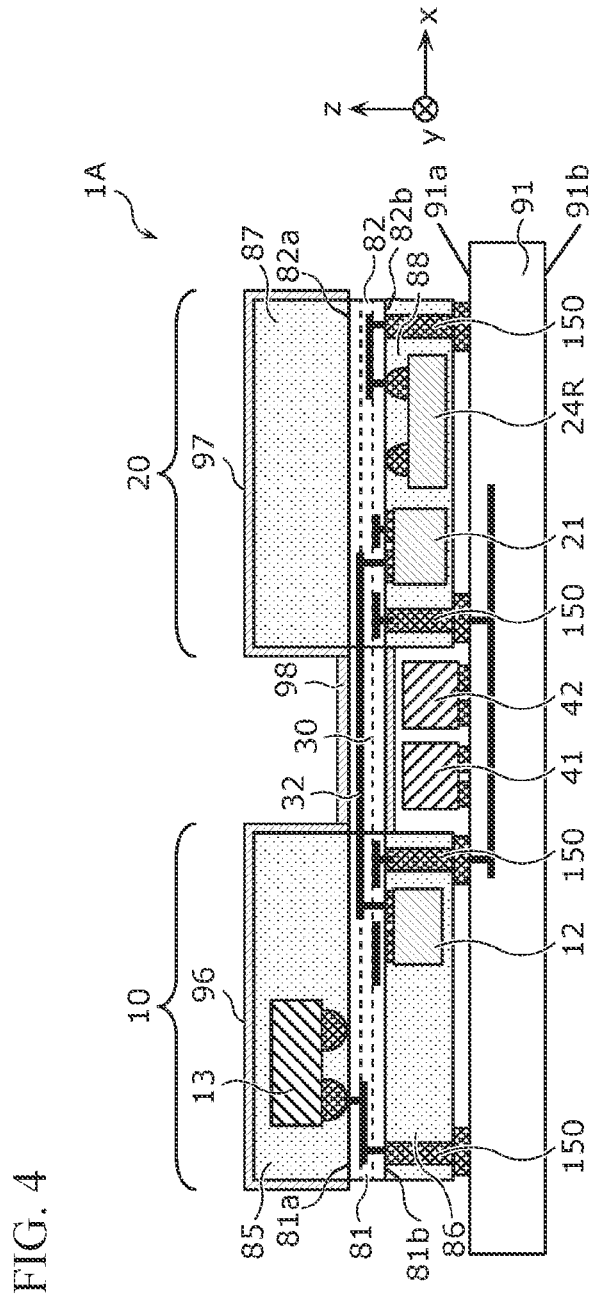
FIG. 4 is a sectional view of schematic configuration of the radio frequency module according to the working example.

3. Circuit Element Layout Configuration of Radio Frequency Module 1A According to Working Example FIG. 3 is a plan view of schematic configuration of a radio frequency module 1A according to a working example. Further, FIG. 4 is a sectional view of schematic configuration of the radio frequency module 1A according to the working example, and specifically, a sectional view at line IV-IV of FIG. 3. Note that in FIG. 3, a layout diagram of circuit elements is illustrated when, of opposing principal surfaces 91a and 91b of the mounting board 91, the principal surface 91a is seen from a positive direction side of z-axis, and a diagram in which circuit components arranged on the module boards 81 and 82 are seen through from the positive direction side of z-axis is illustrated. Note that the circuit components arranged on the principal surface 81a side of the module board 81 and the circuit components arranged on the principal surface 82a side of the module board 82 are shown in the solid lines, and the circuit components arranged on the principal surface 81b side of the module board 81 and the circuit components arranged on the principal surface 82b side of the module board 82 are shown in the dashed lines. Further, in FIG. 3, for facilitating the understanding of spatial relationships between the respective circuit components, marks representing their functions are attached to the respective circuit components. However, such marks are not attached in an actual radio frequency module 1A.

The radio frequency module 1A according to the working example is the one in which the layout configuration of the respective circuit components that make up the radio frequency module 1 according to the embodiment is specified.

As illustrated in FIG. 3 and FIG. 4, in addition to the circuit configuration illustrated in FIG. 1, the radio frequency module 1A according to the present working example further includes the module boards 81 and 82, connection board 30, connection terminals 150, resin members 85 to 88, metal shield layers 96, 97, and 98, and circuit components 41 to 48. In addition to the circuit configuration illustrated in FIG. 1, the submodule 10 further includes the module board 81, the connection terminals 150, the resin members 85 and 86, and the metal shield layer 96. In addition to the circuit configuration illustrated in FIG. 1, the submodule 20 further includes the module board 82, the connection terminals 150, the resin members 87 and 88, and the metal shield layer 97.

The mounting board 91 has the principal surface 91a and the principal surface 91b, which face each other, and is a board on which the submodules 10 and 20 are mounted. As the mounting board 91, for example, a low temperature co-fired ceramics (LTCC) board, a high temperature co-fired ceramics (HTCC) board, a board with built-in components, a board including a redistribution layer (RDL), a printed board, or the like, each of which has a multilayer structure including a plurality of dielectric layers, may be used.

The submodules 10 and 20 are arranged on the principal surface 91a of the mounting board 91.

Note that the radio frequency module 1A may include the mounting board 91.

The module board 81 is one example of a first module board, has the principal surface 81a (first principal surface) and the principal surface 81b (second principal surface), which face each other, and is a board on which the circuit components that make up the submodule 10 are mounted. The module board 82 is one example of a second module board, has the principal surface 82a and the principal surface 82b, which face each other, and is a board on which the circuit components that make up the submodule 20 are mounted. As the module boards 81 and 82, for example, a LTCC board, a HTCC board, a board with built-in components, a board including an RDL, a printed board, or the like, each of which has a multilayer structure including a plurality of dielectric layers, may be used.

The connection board 30 is the board that connects the submodule 10 and the submodule 20. The connection board 30 has two principal surfaces that face each other. As the connection board 30, for example, a LTCC board, a HTCC board, a board with built-in components, a board including an RDL, a printed board, or the like, each of which has a multilayer structure including a plurality of dielectric layers, may be used. In the inside of the connection board 30, the wiring line 31 and the wiring line 32 (first wiring line) that connect a first component of the submodule 10 and a second component of the submodule 20 are formed. Further, the metal shield layer 98 is formed on each of the two principal surfaces of the connection board 30, which face each other.

Note that "in the inside of the connection board 30, the wiring line 31 and the wiring line 32 are formed" is defined to mean that the wiring line 31 and the wiring line 32 are formed in a region sandwiched between the two metal shield layers 98 that face each other.

Note that the antenna connection terminal 110, the transmit input terminal 111, and the receive output terminal 112 may be formed on the module board 81. Further, the antenna connection terminal 120, the transmit input terminal 121, and the receive output terminal 122 may be formed on the module board 82.

The resin member 85 is arranged on the principal surface 81a of the module board 81 and covers part of the circuit components that make up the submodule 10 and the principal surface 81a. The resin member 86 is arranged on the principal surface 81b of the module board 81 and covers part of the circuit components that make up the submodule 10 and the principal surface 81b.

The resin member 87 is arranged on the principal surface 82a of the module board 82 and covers part of the circuit components that make up the submodule 20 and the principal surface 82a. The resin member 88 is arranged on the principal surface 82b of the module board 82 and covers part of the circuit components that make up the submodule 20 and the principal surface 82b.

The resin members 85 to 88 has the capability of ensuring reliability, such as mechanical strength, moisture resistance, and the like, of the circuit components arranged on the module boards 81 and 82. Note that the resin members 85 to 88 are not essential constituent elements of the radio frequency module according to the present disclosure.

As illustrated in FIG. 3, in the submodule 10 according to the present working example, the duplexer 13 and the power amplifier 14T are arranged on the principal surface 81a of the module board 81. On the other hand, the switches 11 and 12 and the low-noise amplifier 14R are arranged on the principal surface 81b of the module board 81.

Further, as illustrated in FIG. 3, in the submodule 20 according to the present working example, the duplexer 23 and the power amplifier 24T are arranged on the principal surface 82a of the module board 82. On the other hand, the switches 21 and 22 and the low-noise amplifier 24R are arranged on the principal surface 82b of the module board 82.

Note that although not illustrated in FIG. 3, wiring lines that connect respective circuit components of the submodule 10 are formed in the inside of the module board 81 or on the principal surfaces 81a and 81b. Further, the foregoing wiring line may alternatively be a bonding wire whose two end portions are each joined to one of the principal surface 81a, the principal surface 81b, and the circuit component included in the submodule 10, or may alternatively be a terminal, an electrode, or a wiring line formed on a surface of a circuit component included in the submodule 10. Further, wiring lines that connect respective circuit components of the submodule 20 are each formed in the inside of the module board 82, on the principal surface 82a, or on the principal surface 82b. Further, the foregoing wiring line may alternatively be a bonding wire whose two end portions are each joined to one of the principal surface 82a, the principal surface 82b, and the circuit component included in the submodule 20, or may alternatively be a terminal, an electrode, or a wiring line formed on a surface of a circuit component included in the submodule 20.

Further, in the radio frequency module 1A according to the present working example, the switch 12 is one example of the first component, and the switch 21 is one example of the second component.

Here, in the radio frequency module 1A according to the present working example, the connection board 30 is directly connected to the module board 81 and the module board 82 and electrically connects the switch 12 (first component) and the switch 21 (second component). Further, the connection board 30 electrically connects the switch 11 and the switch 22.

According to the foregoing configuration, the first component and the second component are electrically connected to each other by the connection board 30 that is directly connected to the module board 81 and the module board 82. Therefore, the wiring line connecting the first component and the second component can be shortened compared with the case where the first component and the second component are electrically connected to each other via a circuit component other than the connection board 30 and a board (for example, the mounting board 91). Accordingly, the transmission loss of a radio frequency signal being transmitted between the submodule 10 and the submodule 20 can be reduced.

Further, in the submodule 10, a plurality of the connection terminals 150 is arranged on the principal surface 81b side, and in the submodule 20, a plurality of the connection terminals 150 is arranged on the principal surface 82b side. The submodule 10 and the submodule 20 send and receive electrical signals to and from each other via the mounting board 91 arranged on the z-axis negative direction side of the radio frequency module 1A and a plurality of the connection terminals 150. Further, some of the plurality of the connection terminals 150 are set at a ground potential of the mounting board 91. On the principal surfaces 81b and 82b that face the mounting board 91, the power amplifiers 14T and 24T whose profile heights are difficult to reduce are not arranged. However, the low-noise amplifiers 14R and 24R and the switches 11, 12, 21, and 22 whose profile heights are easy to be reduced are arranged thereon. Thus, it becomes possible to reduce the profile height of the radio frequency module 1A as a whole. Further, a plurality of the connection terminals 150 that are employed as ground electrodes are arranged around the low-noise amplifiers 14R and 24R that have greatly impact on the receiver sensitivity of the radio frequency module 1A, and thus the degradation of the receiver sensitivity can be suppressed.

Note that as illustrated in FIG. 4, the connection terminals 150 may be column-like electrodes that penetrate through the resin members 86 and 88 in the z-axis direction, or may be bump electrodes formed on the principal surfaces 81b and 82b. In the case where the connection terminal 150 is a bump electrode, there is no need to have the resin members 86 and 88.

Note that as illustrated in FIG. 4, the metal shield layer 98 may be formed on each of the two principal surfaces of the connection board 30, which face each other.

According to this, the metal shield layers 98 electromagnetically shield the wiring lines 31 and 32 from the outside of the connection board 30. Thus, external noise can be reduced, and it becomes possible to improve the quality of radio frequency signals being transmitted by the wiring lines 31 and 32.

Further, the connection board 30 and the module boards 81 and 82 may be composed of the same material.

According to this, the connection board 30 and the module boards 81 and 82 can be formed together, and this simplifies fabrication steps.

Further, the submodule 10 and the submodule 20 may be additionally electrically connected to each other via the mounting board 91.

According to this, at the time of connecting a circuit component of the submodule 10 to a circuit component of the submodule 20, it becomes possible to choose either the connection board 30 or the mounting board 91 for the connection depending on the arranged positions of the circuit components. This improves the flexibility in the arrangement of a wiring line connecting two circuit components and makes it possible to reduce the losses in the wiring line.

Further, in the radio frequency module 1A according to the present working example, the duplexer 13 is one example of a fourth component and arranged on the principal surface 81a. That is to say, the submodule 10 is a double-sided surface-mount type module in which the switch 12 (first component) is arranged on the principal surface 81b and the duplexer 13 (fourth component) is arranged on the principal surface 81a.

According to this, the first component and the fourth component are arranged in such a manner as to be divided into two surfaces of the module board 81, and this makes it possible to increase the packing density and reduce the size of the submodule 10.

Further, as illustrated in FIG. 3, the radio frequency module 1A according to the present working example further includes the circuit components 41 to 48. The circuit components 41 to 48 are examples of third components that are arranged on the mounting board 91 but not on the module board 81 or 82.

Here, as illustrated in FIG. 3 and FIG. 4, in the plan view of the mounting board 91, of the circuit components 41 to 48, the circuit components 41 and 42 overlap at least partially with the connection board 30.

According to this, the region where the connection board 30 is arranged can be effectively shared as a mounting space of the circuit components 41 and 42, and thus it becomes possible to reduce the size of the radio frequency module 1A. Further, compared with the case where the circuit components 41 and 42 are built into the submodule 10 or 20, the isolation between the circuit components 41 and 42 and other circuit components built into the submodule 10 or 20 is improved.

Note that in the submodule 10 according to the present working example, the duplexer 13 and the power amplifier 14T are arranged on the principal surface 81*a*, and the switches 11 and 12 and the low-noise amplifier 14R are arranged on the principal surface 81*b*. However, the present disclosure is not limited thereto. For example, the switches 11 and 12 may be arranged on the principal surface 81*a*, and the duplexer 13 may be arranged on the principal surface 81*b*.

Further, in the submodule 20 according to the present working example, the duplexer 23 and the power amplifier 24T are arranged on the principal surface 82*a*, and the switches 21 and 22 and the low-noise amplifier 24R are arranged on the principal surface 82*b*. However, the present disclosure is not limited thereto. For example, the switches 21 and 22 may be arranged on the principal surface 82*a*, and the duplexer 23 may be arranged on the principal surface 82*b*.

Further, the first component of the submodule 10 and the second component of the submodule 20, which are connected to each other via the connection board 30, are not limited to the switch 12 and the switch 21, respectively. The first component and the second component may alternatively be the switch 11 and the switch 22, respectively. Moreover, the first component and the second component are not necessarily switches so long as the first component and the second component are circuit components to be connected to each other via the connection board 30.

Further, in the submodule 10 according to the present working example, the power amplifier 14T is arranged on the principal surface 81*a*, and the low-noise amplifier 14R is arranged on the principal surface 81*b*.

According to this, the power amplifier 14T that amplifies a transmit signal and the low-noise amplifier 14R that amplifies a receive signal are arranged in such a manner as to be divided into two surfaces of the module board 81, and this improves the isolation between transmitting and receiving in the submodule 10.

Further, in the submodule 20 according to the present working example, the power amplifier 24T is arranged on the principal surface 82*a*, and the low-noise amplifier 24R is arranged on the principal surface 82*b*.

According to this, the power amplifier 24T that amplifies a transmit signal and the low-noise amplifier 24R that amplifies a receive signal are arranged in such a manner as to be divided into two surfaces of the module board 82, and this improves the isolation between transmitting and receiving in the submodule 20.

It is desirable that each of the module boards 81 and 82 has a multilayer structure in which a plurality of dielectric layers are stacked on top of each other and that a ground electrode pattern is formed on at least one of the plurality of dielectric layers. This improves the capability of electromagnetic shielding of the module boards 81 and 82.

Note that instead of the connection board 30, the radio frequency module 1 according to the present embodiment may include a coaxial wiring line that connects the submodule 10 and submodule 20. That is to say, the radio frequency module 1 may include the mounting board 91, the submodule 10 arranged on the mounting board 91, the submodule 20 arranged on the mounting board 91, and the coaxial wiring line that connects the submodule 10 and the submodule 20. The foregoing coaxial wiring line may be arranged in such a manner as to be separated from the mounting board 91, may be directly connected to the module boards 81 and 82, and may electrically connect the first component and the second component.

Note that the coaxial wiring line is one type of covered electric cable for use in electrical communications and is made up of an inner conductor (core line), an outer shield conductor formed in such a manner as to coaxially cover the inner conductor (core line), and a dielectric body formed between the inner conductor (core line) and the outer shield conductor.

According to this, the first component and the second component are electrically connected to each other by the coaxial wiring line that is directly connected to the module board 81 and the module board 82. Therefore, the wiring line connecting the first component and the second component can be shortened compared with the case where the first component and the second component are electrically connected to each other via the mounting board 91. Accordingly, the transmission loss of a radio frequency signal being transmitted between the submodule 10 and the submodule 20 can be reduced.

Figure 5:
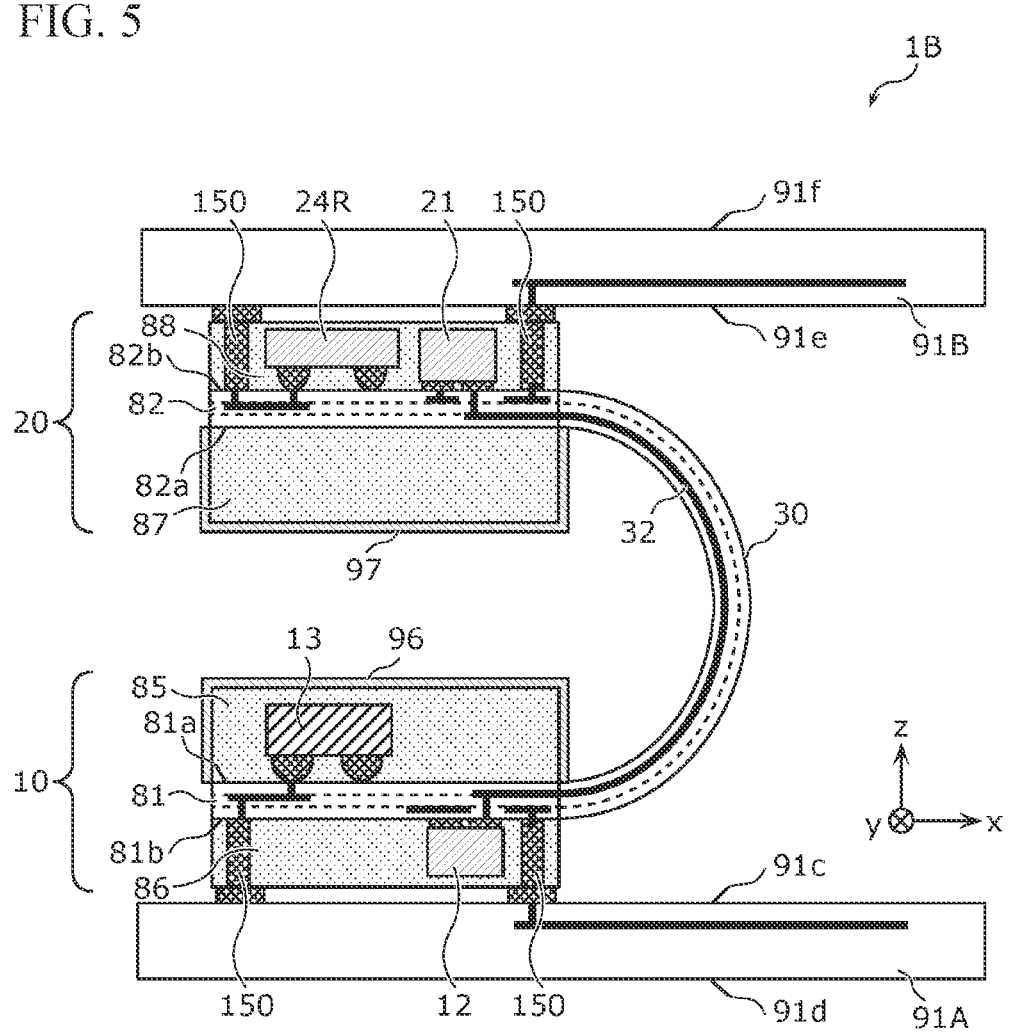
FIG. 5 is a sectional view of schematic configuration of the radio frequency module according to a modified example.

4. Circuit Element Layout Configuration of Radio Frequency Module 1B According to Modified Example FIG. 5 is a sectional view of schematic configuration of a radio frequency module 1B according to a modified example. The radio frequency module 1B according to the present modified example is the one in which the layout configuration of the respective circuit elements that make up the radio frequency module 1 according to the embodiment is specified.

The radio frequency module 1B according to the present modified example is different from the radio frequency module 1A according to the working example in that the submodules 10 and 20 are respectively mounted on different mounting boards 91A and 91B and that the connection board 30 is a flexible board. Hereinafter, the radio frequency module 1B according to the present modified example is described with the emphasis on points different from the radio frequency module 1A according to the working example, and the descriptions for the same points as the radio frequency module 1A according to the working example are omitted.

As illustrated in FIG. 5, in addition to the circuit configuration illustrated in FIG. 1, the radio frequency module 1B according to the present modified example further includes the mounting boards 91A and 91B, the module boards 81 and 82, the connection board 30, the connection terminals 150, the resin members 85 to 88, and the metal shield layers 96 and 97.

The mounting board 91A has a principal surface 91c and a principal surface 91d, which face each other, and is a board on which the submodule 10 is mounted. The mounting board 91B has a principal surface 91e and a principal surface 91f, which face each other, and is a board on which the submodule 20 is mounted. As the mounting boards 91A and 91B, for example, a LTCC board, a HTCC board, a board with built-in components, a board including an RDL, a printed board, or the like, each of which has a multilayer structure including a plurality of dielectric layers, may be used.

The submodule 10 is arranged on the principal surface 91c of the mounting board 91A. The submodule 20 is arranged on the principal surface 91e of the mounting board 91B.

The connection board 30 according to the present modified example is a board that connects the submodule 10 and the submodule 20. The connection board 30 has two principal surfaces that face each other. As the connection board 30, a flexible board such as, for example, a resin multilayer board that uses liquid crystal polymer or a similar board may be used. The resin multilayer board that uses liquid crystal polymer is a board that can be bent flexibly and can retain a bent state. In the inside of the connection board 30, the wiring line 32 (first wiring line) that connects the first component of the submodule 10 and the second component of the submodule 20 is formed.

Note that the module boards 81 and 82 of the present modified example may be composed of a material different from that of the connection board 30 or may be composed of the same material as that of the connection board 30.

In the radio frequency module 1B according to the present modified example, the connection board 30 is directly connected to the module board 81 and the module board 82 and electrically connects the switch 12 (first component) and the switch 21 (second component).

According to the foregoing configuration, the first component and the second component are electrically connected to each other by the connection board 30 that is directly connected to the module board 81 and the module board 82. Therefore, the wiring line connecting the first component and the second component can be shortened compared with the case where the first component and the second component are electrically connected to each other via the mounting boards 91A and 91B. Accordingly, the transmission loss of a radio frequency signal being transmitted between the submodule 10 and the submodule 20 can be reduced.

Further, in the present modified example, because the connection board 30 is a flexible board, the submodule 10 and the submodule 20 can be arranged, for example, in such a manner as to face each other in the vertical direction of the module boards 81 and 82. Further, the submodules 10 and 20 can be arranged in a region sandwiched between the mounting boards 91A and 91B, which are arranged in such a manner as to face each other. That is to say, because the flexibility in the layout of the submodules 10 and 20 is improved, it becomes possible to increase the packing density and reduce the size of the radio frequency module 1B.

5. Advantageous Effects and the Like

As described above, the radio frequency module 1A according to the present working example includes the submodules 10 and 20 and the connection board 30 that connects the submodule 10 and the submodule 20. The submodule 10 includes the module board 81 and the first component arranged on the module board 81, the submodule 20 includes the module board 82 and the second component arranged on the module board 82, and the connection board 30 is directly connected to the module boards 81 and 82 and electrically connects the first component and the second component.

According to this, the first component and the second component are electrically connected to each other by the connection board 30 that is directly connected to the module boards 81 and 82. Therefore, the wiring line connecting the first component and the second component can be shortened compared with the case where the first component and the second component are electrically connected to each other via a circuit component other than the connection board 30 and a board (for example, the mounting board 91). Accordingly, the transmission loss of a radio frequency signal being transmitted between the submodule 10 and the submodule 20 can be reduced.

Further, in the radio frequency module 1A, the metal shield layer 98 may be formed on each of the two principal surfaces of the connection board 30, which face each other, and the wiring line 32 that connects the first component and the second component may be formed in the inside of the connection board 30.

According to this, the metal shield layers 98 electromagnetically shield the wiring line 32 from the outside of the connection board 30. Thus, external noise can be reduced, and it becomes possible to improve the quality of a radio frequency signal being transmitted by the wiring line 32.

Further, in the radio frequency module 1A, the connection board 30 and the module boards 81 and 82 may be composed of the same material.

According to this, the connection board 30 and the module boards 81 and 82 can be formed together, and this simplifies fabrication steps.

Further, the radio frequency module 1B according to the present modified example may be a flexible board.

According to this, the flexibility in the layout of the submodules 10 and 20 is improved, and this makes it possible to increase the packing density and reduce the size of the radio frequency module 1B.

Further, the radio frequency module 1A may further include the mounting board 91 on which the submodules 10 and 20 are arranged.

Further, the radio frequency module 1A may further include the third component that is arranged on the mounting board 91 but not on the module board 81 or 82.

Further, in the radio frequency module 1A, in the plan view of the mounting board 91, the third component may overlap at least partially with the connection board 30.

According to this, the region where the connection board 30 is arranged can be effectively shared as a mounting space of the third component, and thus it becomes possible to reduce the size of the radio frequency module 1A.

Further, in the radio frequency module 1A, the submodule 10 and the submodule 20 may be electrically connected to each other via the mounting board 91.

According to this, at the time of connecting the submodules 10 and 20, it becomes possible to choose either the connection board 30 or the mounting board 91 for the connection. This improves the flexibility in the layout of wiring lines and makes it possible to reduce the losses in the wiring lines.

Further, the radio frequency module 1A may further include the fourth component, the first component may be arranged on the principal surface 81b, and the fourth component may be arranged on the principal surface 81a.

According to this, the first component and the fourth component are arranged in such a manner as to be divided into two surfaces of the module board 81, and this makes it possible to increase the packing density and reduce the size of the submodule 10.

Further, in the radio frequency module 1A, the submodule 10 may further include the switch 11, the first component may be the switch 12, the fourth component may be the duplexer 13, the submodule 20 may further include the switch 22 and the duplexer 23, the second component may be the switch 21, the switch 11 may switch between connecting and disconnecting the antenna connection terminal 110 to and from the switch 12 and may switch between connecting and disconnecting the antenna connection terminal 110 to and from the switch 22, the switch 21 may switch between connecting and disconnecting the antenna connection terminal 120 to and from the switch 12 and may switch between connecting and disconnecting the antenna connection terminal 120 to and from the switch 22, the switch 12 may switch between connecting the duplexer 13 to the switch 11 and connecting the duplexer 13 to the switch 21, the switch 22 may switch between connecting the duplexer 23 to the switch 21 and connecting the duplexer 23 to the switch 11, and the switch 12 and the switch 21 may be connected to each other via the connection board 30.

Further, in the radio frequency module 1A, the submodule 10 may further include the connection terminal 150 that is arranged on the principal surface 81b and connects the module board 81 and the mounting board 91, the first component may be arranged on the principal surface 81b, and the fourth component may be arranged on the principal surface 81a.

Further, the radio frequency module 1 according to the present embodiment may include the mounting board 91, the submodule 10 arranged on the mounting board 91, the submodule 20 arranged on the mounting board 91, and the coaxial wiring line that connects the submodule 10 and the submodule 20. The submodule 10 may include the module board 81 and the first component arranged on the module board 81, the submodule 20 may include the module board 82 and the second component arranged on the module board 82, and the coaxial wiring line may be directly connected to the module boards 81 and 82 and electrically connect the first component and the second component.

According to this, the first component and the second component are electrically connected to each other by the coaxial wiring line that is directly connected to the module board 81 and the module board 82. Therefore, the wiring line connecting the first component and the second component can be shortened compared with the case where the first component and the second component are electrically connected to each other via the mounting board 91. Accordingly, the transmission loss of a radio frequency signal being transmitted between the submodule 10 and the submodule 20 can be reduced.

Further, the communication device 4 includes the RFICs 3A and 3B that perform processing on radio frequency signals being transmitted and received by the antennas 2A and 2B, and the radio frequency module 1 that transmits radio frequency signals between the antennas 2A and 2B and the RFICs 3A and 3B.

According to this, it becomes possible to provide the communication device 4 that can reduce the transmission loss of the submodules 10 and 20 arranged on the mounting board 91.

Further, in the communication device 4, the antenna 2A may be connected to the antenna connection terminal 110, and the antenna 2B may be connected to the antenna connection terminal 120.

Other Embodiments and the Like

The radio frequency modules and the communication devices according to embodiments of the present disclosure have been described using the embodiment, the working example, and the modified example. However, the radio frequency module and the communication device according to the present disclosure are not limited to the foregoing embodiment, working example, and modified example. Other embodiments realized by combining optional constituent elements of the foregoing embodiment, working example, and modified example, modified examples obtained by applying various modifications conceivable to those skilled in the art to the foregoing embodiment, working example, and modified example without departing the scope of the present disclosure, and various devices incorporating the foregoing radio frequency module and communication device may also be included in the present disclosure.

For example, in the radio frequency module and the communication device according to the foregoing embodiment, working example, and modified example, another circuit element, a wiring line, or the like may be inserted in a path connecting each circuit element and a signal path disclosed in the drawings.

The present disclosure can be widely used in communication devices such as mobile phones and the like as a radio frequency module to be installed in a multiband front-end unit.

1, 1A, 1B Radio frequency module
2A, 2B Antenna
3A, 3B RF signal processing circuit (RFIC)
4 Communication device
10, 20 Submodule
11, 12, 21, 22 Switch
11a, 12a, 21a, 22a Common terminal
11b, 11c, 11d, 12b, 12c, 21b, 21c, 21d, 22b, 22c Selection Terminal
13, 23 Duplexer
13R, 23R Receive filter
13T, 23T Transmit filter
14R, 24R Low-noise amplifier
14T, 24T Power amplifier
30 Connection board
31, 32 Wiring line
41, 42, 43, 44, 45, 46, 47, 48 Circuit component
81, 82 Module board
81a, 81b, 82a, 82b, 91a, 91b, 91c, 91d, 91e, 91f Principal Surface
85, 86, 87, 88 Resin member
91, 91A, 91B Mounting board
96, 97, 98 Metal shield layer
110, 120 Antenna connection terminal
111, 121 Transmit input terminal
112, 122 Receive output terminal
150 Connection terminal

The invention claimed is:

1. A radio frequency module comprising:
    a first module;
    a second module; and
    a connection board connecting the first module and the second module, wherein
    the first module includes a first module board and a first component arranged on the first module board,
    the second module includes a second module board and a second component arranged on the second module board,
    the connection board is directly connected to the first module board and the second module board, and electrically connects the first component and the second component
    the first module further includes a fourth component,
    the first module board has a first principal surface and a second principal surface, the first principal surface and the second principal surface facing one another,
    the first component is arranged on one of the first principal surface and the second principal surface, and
    the fourth component is arranged on another of the first principal surface and the second principal surface.

2. The radio frequency module according to claim 1, wherein
    a metal shield layer is provided on each of two principal surfaces of the connection board, the two principal surfaces facing one another, and
    a first wiring line connecting the first component and the second component is provided in an inside of the connection board.

3. The radio frequency module according to claim 1, wherein
    the connection board, the first module board, and the second module board are composed of a same material.

4. The radio frequency module according to claim 1, wherein
    the connection board is a flexible board.

5. The radio frequency module according to claim 1, further comprising:
    at least one mounting board on which the first module and the second module are arranged.

6. The radio frequency module according to claim 5, further comprising:
    a third component arranged on the mounting board and not arranged on the first module board or the second module board.

7. The radio frequency module according to claim 6, wherein
    in a plan view of the mounting board, the third component overlaps at least partially with the connection board.

8. The radio frequency module according to claim 5, wherein
    the first module and the second module are electrically connected to one another via the mounting board.

9. The radio frequency module according to Claim 1, wherein
    the first module further includes a first antenna switch,
    the first component is a first switch,
    the fourth component is a first filter,
    the second module further includes a second switch and a second filter,
    the second component is a second antenna switch,
    the first antenna switch is configured to switch between connecting and disconnecting a first antenna connection terminal to and from the first switch, and switch between connecting and disconnecting the first antenna connection terminal to and from the second switch,
    the second antenna switch is configured to switch between connecting and disconnecting a second antenna connection terminal to and from the first switch, and switch between connecting and disconnecting the second antenna connection terminal to and from the second switch,
    the first switch is configured to switch between connecting the first filter to the first antenna switch and connecting the first filter to the second antenna switch,
    the second switch is configured to switch between connecting the second filter to the second antenna switch and connecting the second filter to the first antenna switch, and
    the second antenna switch and the first switch are connected to one another via the connection board.

10. The radio frequency module according to Claim 1, wherein
    the first module further includes a connection terminal arranged on the second principal surface and connecting the first module board and a mounting board on which the first module and the second module are arranged,
    the first component is arranged on the second principal surface, and
    the fourth component is arranged on the first principal surface.

11. A communication device comprising:
    an RF signal processing circuit configured to perform processing on a radio frequency signal being transmitted or received by an antenna; and
    the radio frequency module according to claim 1 that transmits the radio frequency signal between the antenna and the RF signal processing circuit.

12. A communication device comprising:
    a first antenna connected to the first antenna connection terminal;
    a second antenna connected to the second antenna connection terminal;
    an RF signal processing circuit configured to perform processing on radio frequency signals being transmitted and received by the first antenna and the second antenna; and
    the radio frequency module according to claim 10 configured to transmit the radio frequency signals between the first and second antennas and the RF signal processing circuit.

13. The radio frequency module according to claim 2, wherein
    the connection board, the first module board, and the second module board are composed of a same material.

14. The radio frequency module according to claim 2, wherein
    the connection board is a flexible board.

15. The radio frequency module according to claim 3, wherein
    the connection board is a flexible board.

16. The radio frequency module according to claim 2, further comprising:
    at least one mounting board on which the first module and the second module are arranged.

17. The radio frequency module according to claim 3, further comprising:
    at least one mounting board on which the first module and the second module are arranged.

18. The radio frequency module according to claim 4, further comprising:
    at least one mounting board on which the first module and the second module are arranged.

\* \* \* \* \*

UNITED STATES PATENT AND TRADEMARK OFFICE
CERTIFICATE OF CORRECTION

| | | |
|---|---|---|
| PATENT NO. | : 12,482,943 B2 | Page 1 of 1 |
| APPLICATION NO. | : 18/302153 | |
| DATED | : November 25, 2025 | |
| INVENTOR(S) | : Takanori Uejima | |

It is certified that error appears in the above-identified patent and that said Letters Patent is hereby corrected as shown below:

In the Specification

Column 1, Line 34, "Unexamined Patent" should be --Unexamined Patent Application Publication No. 2012-33885--

Signed and Sealed this
Tenth Day of February, 2026

John A. Squires
*Director of the United States Patent and Trademark Office*